United States Patent

Ban

[11] Patent Number: 4,591,108
[45] Date of Patent: May 27, 1986

[54] DRAGGING DEVICE FOR A SPINNING REEL

[75] Inventor: Masuo Ban, Sakai, Japan

[73] Assignee: Shimano Industrial Company Limited, Osaka, Japan

[21] Appl. No.: 654,551

[22] Filed: Sep. 26, 1984

[30] Foreign Application Priority Data

Sep. 30, 1983 [JP] Japan .................. 58-183921
Dec. 5, 1983 [JP] Japan .................. 58-188236[U]
Dec. 29, 1983 [JP] Japan .................. 58-203722[U]

[51] Int. Cl.⁴ .................................................. A01K 89/02
[52] U.S. Cl. .................................................. 242/84.5 R
[58] Field of Search ............ 242/84.5 A, 84.5 P, 242/84.51 A; 188/71.5

[56] References Cited

U.S. PATENT DOCUMENTS 2,656,993 10/1953 Dukes .................. 242/84.53
2,988,298 6/1961 Purnell ................ 242/84.53
4,466,580 8/1984 Toda ................... 242/84.5 P

Primary Examiner—Billy S. Taylor

Attorney, Agent, or Firm—Stevens, Davis, Miller & Mosher

[57] ABSTRACT

A dragging device for a spinning reel, which applies a rotational resistance to a spool shaft carrying a spool. The dragging device includes a first drag mechanism including first dragging members non-rotatable relative to the reel body, second dragging members rotatable together with the spool shaft, and a first adjusting member for causing the first and second dragging members to make press-contact with each other to apply an adjustable dragging force to the spool shaft. The dragging device further includes a second drag mechanism provided with third dragging members non-rotatable relative to the reel body, fourth dragging members rotatable together with the spool shaft, and a second adjusting member for causing the third and fourth dragging members to make press-contact with each other to apply an adjustable dragging force to the spool shaft. Each adjusting member applies to the spool shaft through the first and second drag mechanisms a dragging force which may be adjusted independently of each other. The rotational resistance applied to the spool shaft therefore includes the sum of the dragging forces applied by each drag mechanism.

17 Claims, 17 Drawing Figures

DRAGGING DEVICE FOR A SPINNING REEL

FIELD OF THE INVENTION

This invention relates to a dragging device for a spinning reel, and more particularly to a dragging device for a spinning reel wherein a rotary frame is rotated by a handle to wind up a fishing line onto a spool and wherein a drag mechanism applies a resistance against rotation of a spool shaft carrying the spool.

BACKGROUND OF THE INVENTION

Generally, when a spinning reel is used to catch a fish, the handle is operated to rotate the rotary frame to wind up the line onto the spool the risk exists that the line, when subjected to a load overcoming the durability of the line, may be snapped.

Therefore, spinning reels generally incorporate into the reel body a drag mechanism comprising dragging members at the reel body side, dragging members at the spool shaft side, and a knob for adjusting both the dragging members in the amount of press-contact force which they make with each other, so that the knob is operated to give to the rotation of the spool shaft a desired resistance corresponding to the durability of the line.

The drag mechanism is adjustable of its dragging force applied to the spool via the spool shaft in a range of 0 to 100%, but the dragging force, when a ratio of variation thereof is made larger with respect to a quantity of operation of the knob, will be changed by a large amount even with a small quantity of operation of the same.

Accordingly, for example, when a hooked fish abruptly pulls the line, the knob is often operated to readjust the dragging force more than necessary, resulting in that the spool shaft being subjected to a dragging force overcoming the durability of the line or that it is excessively weakened.

In a case where a ratio of change in the dragging force with respect to the operational quantity of the drag knob is reduced, an abrupt change is not created in the dragging force even when the drag knob is operated to a somewhat large extent.

Hence, when the dragging force of the drag mechanism is adjusted, a problem such that a dragging force overcoming durability of the line is given to the spool shaft, or the dragging force is reduced too much, is eliminated, but a problem is created in that rapid adjustment is not possible.

SUMMARY OF THE INVENTION

An object of the invention is to provide a dragging device for a spinning reel, which uses first and second drag mechanisms which are adapted to adjust the dragging force independently of each other, so that the two dragging mechanisms are operated to enable simple and accurate adjustment of the dragging force applied to the spool shaft to thereby obtain a proper amount of dragging force to cope with a particular encountered fishing condition.

This invention is characterized in that the dragging device for the spinning reel which applies a rotational resistance to the spool shaft carrying a spool comprises a first drag mechanism provided with first dragging members at the reel body side and non-rotatable relative to the reel body, second dragging members at the spool shaft side and rotatable together with the spool shaft, and a first adjusting member for bringing the first and second dragging members into press-contact with each other to adjust a dragging force, and a second drag mechanism provided with third dragging members at the reel body side and non-rotatable relative to the reel body, fourth dragging members at the spool shaft side and rotatable together with the spool shaft, and a second adjusting member for bringing the third and fourth dragging members into press-contact with each other to adjust the dragging force, so that the first and second adjusting members independently adjust the dragging force applied to the spool shaft through the first and second drag mechanisms, and the sum of the dragging forces adjusted by the drag mechanisms is adapted to be applied to the spool shaft.

Hence, the dragging device of the invention, while the spool shaft is subjected to the sum of the dragging forces adjusted by the first and second drag mechanisms respectively, can select each adjusting member at the first or second drag mechanism to obtain the independently adjusted dragging force of each of the drag mechanisms.

In other words, the characteristic of the invention is that in the state where one drag mechanism gives a predetermined dragging force to the spool shaft, the other drag mechanism can adjust its dragging force to increase the dragging force given by the one drag mechanism, which is assumed to be a minimum.

Thus, the minimum dragging force to be given by the one drag mechanism is adjusted thereby so that an adjusting range of the dragging force adjusted by the other drag mechanism is desirably changeable.

Accordingly, even when the other drag mechanism adjusts its dragging force to a minimum, the minimum dragging force having been set by the one drag mechanism is ensured so that there is no fear that the dragging force will decrease more than is needed. Also, even when the other drag mechanism adjusts its dragging force to a maximum, the sum of the maximum value of the dragging force applied by the other drag mechanism and the set value of the one drag mechanism, is given, thereby not excessively increasing the dragging force.

Moreover, the minimum dragging force set by the one drag mechanism is adjustable in the range of 0 to 100% thereof, whereby the adjusting range of the dragging force applied by the other drag mechanism is desirably changeable.

In addition, one of the first and second drag mechanisms sets the aforesaid minimum dragging force, in which either of the drag mechanisms may be selected.

The above and further objects and novel features of the invention will be more fully apparent from the following detailed description when the same is read in connection with the accompanying drawings.

DETAILED DESCRIPTION OF THE INVENTION

Figure 1:
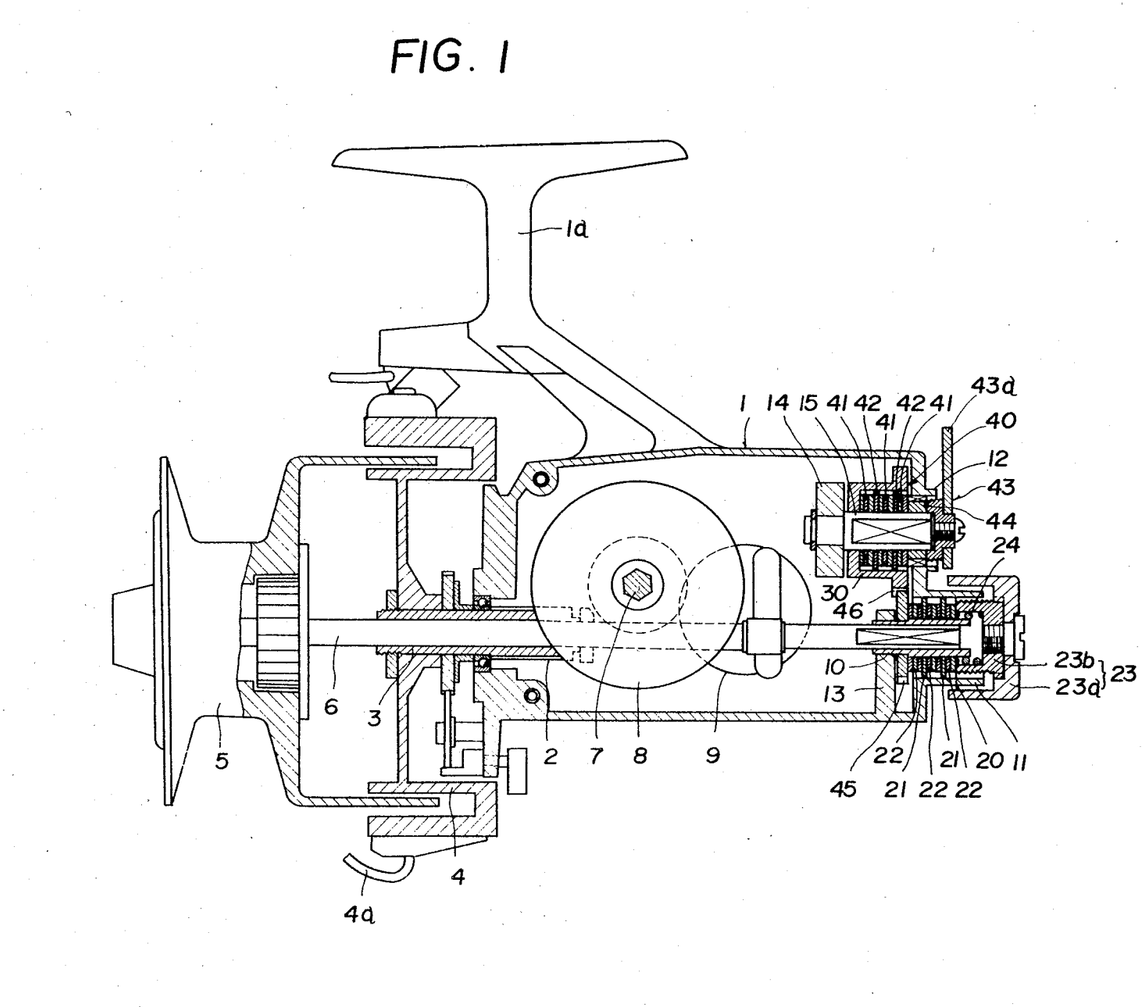
FIG. 1 is a longitudinal sectional front view of a first embodiment of a dragging device for a spinning reel of the invention.
Figure 2:
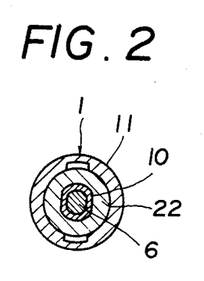
FIGS. 2 through 4 are cross-sectional views of the principal portion only of the first embodiment.
Figure 3:
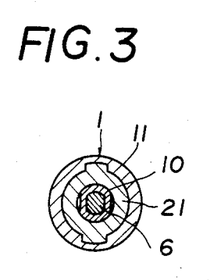
Figure 4:
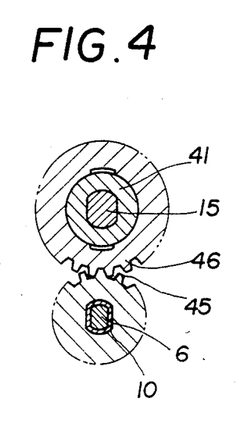

Referring to FIG. 1, a fishing reel is provided with a hollow reel body 1 having at its upper surface a mounting leg 1a for a fishing rod and at its front wall a through bore. A tubular drive shaft 3 carrying a pinion 2 is supported rotatably in the through bore at the reel body 1, and a rotary frame 4 having a bail arm 4a is mounted to the outer periphery at the utmost end of drive shaft 3. A spool shaft 6 having a spool 5 is supported into a shaft bore of drive shaft 3 in relation of being rotatable relative to and slidable longitudinally of reel body 1, and a handle shaft 7 is rotatably supported to the side wall of reel body 1 and extends perpendicularly with respect to the drive shaft 3.

The handle shaft 7 is provided at its portion entering into the reel body 1 with a master gear 8 in mesh with the pinion 2 and at the portion projecting outwardly from the same with a handle (not shown). The handle is operated to drive the drive shaft 3 so as to rotate the rotary frame 4, and the spool 5 is moved longitudinally of reel body 1 through a reciprocation mechanism 9, thereby winding up a fishing line onto the spool.

A dragging device for a spinning reel of the invention is provided at the reel body 1. The dragging device includes a first drag mechanism 20 comprising first dragging members 21 at the reel body side, second dragging members 22 at the spool shaft side and rotatable together with the spool shaft 6, and a first adjusting member 23 for press-contacting the first and second dragging members 21 and 22 with each other to adjust the dragging force of first drag mechanism 20. The dragging device also includes a second drag mechanism 40 comprising third dragging members 41 at the reel body 1, fourth dragging members 42 at the spool shaft side and rotatable together with the spool shaft 6, and a second adjusting member 43 for press-contacting the third and fourth dragging members 41 and 42 with each other to adjust a dragging force of second drag mechanism 40, so that the dragging force applied to the drive shaft 6 is adjusted independently through the first or second drag mechanism 20 or 40 and the sum of the dragging forces adjusted by the drag mechanisms 20 and 40 is adapted to be applied to the spool shaft 6.

Referring also to FIG. 1, the reel body 1 is provided at its rear wall with two through bores and first and second support cylinders 11 and 12 extending rearwardly from around the through bores respectively. Support walls 13 and 14 are provided at positions within the reel body 1 opposite to the first and second drag mechanisms respectively. Support wall 13 rotatably supports a rotary tubular shaft 10 entering at the rear end into the first support cylinder 11, so that the spool shaft 6 is fitted at its rear end into the rotary tubular shaft 10 in relation of being non-rotatable relative thereto and axially slidable relative thereto. First drag mechanism 20 is provided between the inner periphery of first support cylinder 11 and the rotary tubular shaft 10. A support shaft 15 is supported to the support wall 14, and a rotary member 30 in the form of a bottomed cylinder is supported rotatably onto the outer periphery of one axial end of support shaft 15. A locking member 44 is provided between the outer periphery of support shaft 15 and the inner periphery of second support cylinder 12 in relation of being non-rotatable but axially slidable. Second drag mechanism 40 is provided around the support shaft 15. A main gear 45 is provided on the outer periphery of rotary tubular shaft 10 at the front end thereof, and a subordinate gear 46 in mesh with the main gear 45 is provided at the periphery of the open end of rotary member 30, so that the rotary member 30 is in rotational association with the spool shaft 6 through the rotary tubular shaft 10. In addition, the association means of rotary member 30 with the spool shaft 6 is not particularly defined.

The first drag mechanism 20 is constructed such that the first dragging members 21 at the reel body side are supported non-rotatably and axially slidably to the inner periphery of first support cylinder 11, the second dragging members 22 at the spool shaft side are supported not-rotatably and axially slidably onto the outer periphery of rotary tubular shaft 10, the first adjusting member 23 screws rotatably with the inner periphery of first support cylinder 11, and a spring 24 is interposed between the first adjusting member 23 and the second dragging member 22 at the spool shaft side. Hence, the first adjusting member 23 is rotated to press-contact the first dragging members 21 and second dragging members 22 with each other, and comprises an initial load setting knob 23a for setting a rotation starting load on the spool shaft 6 and an adjuster 23b engageable detachably with the knob 23a, the adjuster 23b screwing with the inner periphery of first support cylinder 11.

The second drag mechanism 40 is constructed such that the third dragging members 41 at the reel body side are supported non-rotatably and axially slidably onto the outer periphery of support shaft 15, the fourth dragging members 42 at the spool shaft side are supported non-rotatably and axially slidably onto the inner periphery of rotary member 30, and the second adjusting member 43 screws with the inner periphery of second support cylinder 12. The second adjusting member 43 is operated to press-contact the third and fourth dragging members 41 and 42 with each other. Also, the second adjusting member 43 is provided with a lever-like-shaped control 43a projecting therefrom radially outwardly of support cylinder 15. Hence, an angler can operate the second adjusting member 43 by, for example, the forefinger of his hand gripping the fishing rod carrying the reel body 1.

Also, the coefficient of friction between the third and fourth dragging members 41 and 42 at the second drag mechanism is made smaller than that between the first and second dragging members 21 and 22 at the first drag mechanism 20. Thus, a variation in the dragging force with respect to an amount of operation of adjusting member 43 is made smaller than that with respect to the amount of operation of first adjusting member 23, thereby enabling fine adjustment of the dragging force by operating the second adjusting member 43. Alternatively, the fine adjustment means may comprise a small screw pitch at the screw thread of second adjusting member 43, a spring of small elastic modulus interposed between the second adjusting member 43 and the third dragging members 41, or a change in gear ratio between the main and subordinate gears 45 and 46.

In operation, with respect to the dragging device constructed as abovementioned, the first adjusting member 23 is rotated to press-contact the first and second dragging members 21 and 22 to thereby enable a predetermined dragging force to be applied to the tubular shaft 10, and in turn to the spool shaft 6 fitted therein. The control lever 43a swings to press-contact the third and fourth dragging members 41 and 42, so that the rotary member 30 supporting the fourth dragging member 42, and in turn the rotary tubular shaft 10 in association with the rotary member 30 through the gears 45 and 46 and the spool shaft 6 fitted into the tubular shaft 10, can be subjected to a dragging force different from that applied by the first drag mechanism 20 alone. Thus, the spool shaft 6 is subjected to the sum of the dragging forces applied by the first and second drag mechanisms 20 and 40.

In the first embodiment described above, the first drag mechanism 20 applies a large variation in the dragging force with respect to quantity of operation of first adjusting member 23, while the second drag mechanism 40 applies a smaller variation in dragging force relative to the degree of operation of second adjusting member 43, whereby, for example, the first adjusting member 23 at the first drag mechanism 20 is rotated to roughly preadjust the dragging force of first drag mechanism 20 to a minimum. Then, depending on the fishing condition, the second adjusting member 43 at the second drag mechanism 40 is operated in a swinging motion to enable fine adjustment of the roughly adjusted dragging force by the first drag mechanism 20.

In other words, the second adjusting member 43 can be adjusted with respect to its degree of operation in a range from 0 to 100% so that whatever dragging force is applied by second drag mechanism 40 is added to the minimum dragging force applied by first drag mechanism 20, thereby increasing the dragging force by a variation corresponding to the degree of operation of second drag mechanism 40.

Therefore, the dragging force of second drag mechanism 40 is so adjusted that the dragging force of first drag mechanism 20 is set to a minimum, to which the maximum dragging force of second drag mechanism 40 is added, thereby using the total of the above forces as the maximum value. Hence, the problem of using a too large or a too small dragging force is eliminated.

Moreover, the minimum dragging force is variable desirably by adjusting the first drag mechanism 20, thereby making it possible to change the range of adjustment by the second drag mechanism 40.

Incidentally, the first and second adjusting members 23 and 43 are not particularly defined in construction.

Figure 5:
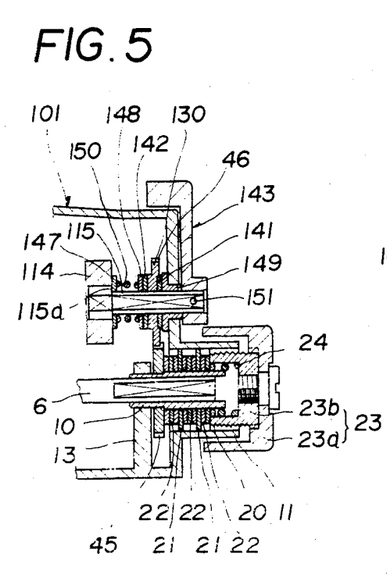
FIG. 5 is a longitudinal sectional front view of a second embodiment of the invention, showing the principal portion only.
Figure 6:
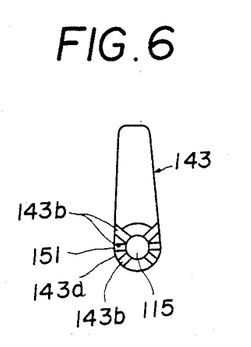
FIG. 6 is a side view of a second adjusting member of the second embodiment.
Figure 7:
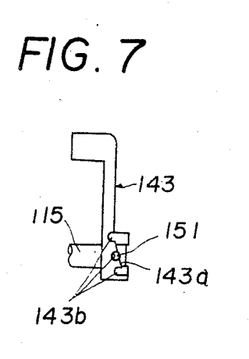
FIG. 7 is a partially omitted front view of the second adjusting member of the second embodiment.

Alternatively, a second adjusting member 143, as shown in FIGS. 5 through 7, may be supported rotatably only to a reel body 101 through a support shaft 115 and be rotated to move the support shaft 115 axially slidably to press-contact third and fourth dragging members 141 and 142.

Referring to FIGS. 5 through 7, the support shaft 115 having a shoulder 115a at an intermediate portion thereof is supported at one end non-rotatably and axially slidably to a support wall 114, and carries a rotary member 130. Third and fourth dragging member 141 and 142 abut against both sides of rotary member 130, a pair of spring seats 147 and 148, and a bearing 149. Rotary member 130 and third and fourth dragging members 141 and 142 are rotatable with respect to the support shaft 115, and the spring seats 147 and 148 and bearing 149 are non-rotatable and axially slidable with respect to the same. Spring 150 is interposed between the spring seats 147 and 148, and support shaft 115 projects at the rear end thereof rearwardly outwardly from the reel body 101. The second adjusting member 143 is supported rotatably onto the rear end of support shaft 115, and provided at the outside surface with a cam face 143a oriented axially outwardly of support shaft 115 and tilted circumferentially thereof. Cam face 143a is provided with a plurality of recesses 143b for positioning the second adjusting member 143 when operated as shown in FIGS. 6 and 7. Also, at the rear end of support shaft 115 is provided an engaging projection 151 engageable with the cam face 143a so that the second adjusting member 143 rotates to change the engaging position of cam face 143a with the engaging projection 151 to thereby allow the support shaft 115 to slide axially. Such movement of support shaft 115 is transferred to the spring seat 148 through the shoulder 115a, spring seat 147 and spring 150, thereby press-contacting the third and fourth dragging members 141 and 142 with each other. In addition, in FIG. 5, the components which are the same as those in the first embodiment in FIGS. 1 through 4 are designated by the same reference numerals.

Now, referring to FIGS. 8 through 12, a third embodiment of the invention is shown, in which a support cylinder 211 projects rearwardly from the rear of a reel body 201 and is partitioned therein by a partition 212 to divide cylinder 211 into a front chamber 211a and a rear chamber 211b. First and second dragging members 221 and 222 at a first drag mechanism 220 are housed in the rear chamber 211b, and third and fourth dragging members 241 and 242 at a second drag mechanism 240 are housed in the front chamber 211a, thus disposing both the drag mechanisms on the spool shaft in a manner of sandwiching the partition 212.

Figure 8:
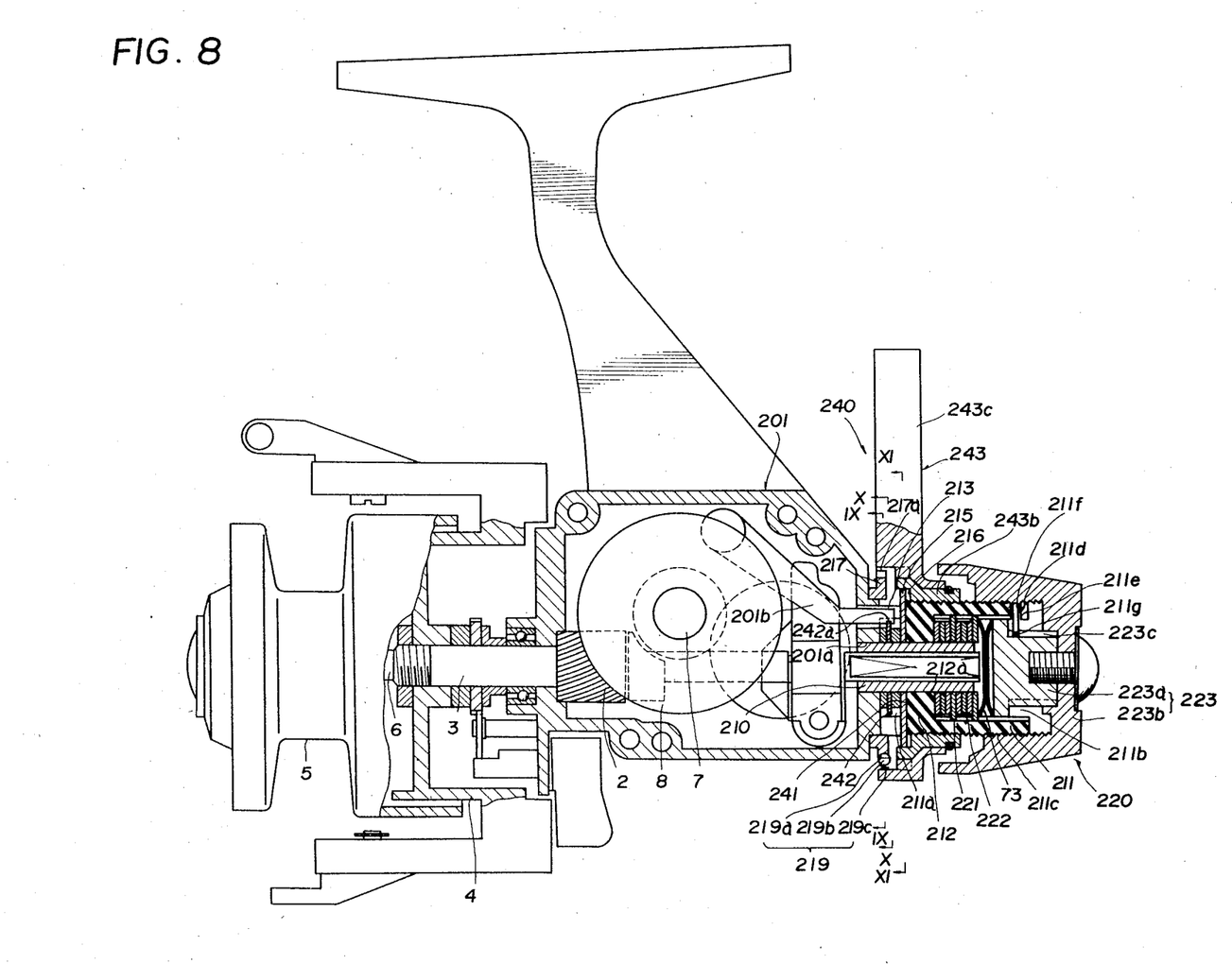
FIG. 8 is a longitudinal sectional front view of a third embodiment of the invention.
Figure 9:
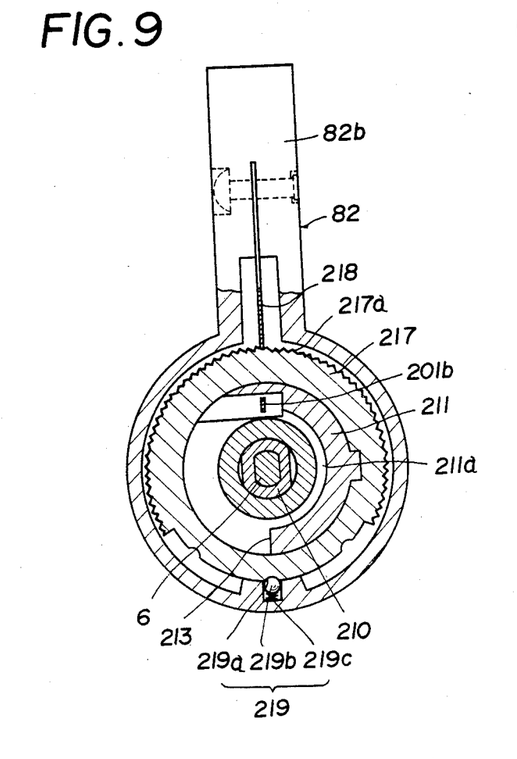
FIG. 9 is a sectional view taken on the line IX—IX in FIG. 8.

In detail, the reel body 201 is provided at the rear wall with a through bore 201a, a support cylinder 211 extending rearwardly therefrom and having a screw thread 211c, and a window 213 at the root thereof. The support cylinder 211 is partitioned into the front chamber 211a and rear chamber 211b by a partition 212 having a central through bore 212a and provided at a lengthwise intermediate portion in the support cylinder 211. Rotary tubular shaft 210 entering at the rear end into the rear chamber 211b is supported rotatably into the through bores 201a and 212a, and the spool shaft 6 entering at the axial end into the reel body 201 is fitted into the rotary tubular shaft 210 in relation of being non-rotatable relative thereto and axially movable relative thereto. The first dragging members 221 at the reel body side in the first drag mechanism 220 are supported non-rotatably and axially movably onto the inner peripheral surface of support cylinder 211 and the second dragging members 222 at the spool shaft side in the first drag mechanism 220 are supported non-rotatably and axially movably onto the outer peripheral surface of the rear end of rotary tubular shaft 210 in the rear chamber 211b. A first adjusting member 223 in the first drag mechanism 220 comprises a pusher 223a abutting against the outermost dragging member 221 through dish-like leaf springs 73 and a cup-like knob 223b engageable detachably with the pusher 223a. First adjusting member 223 screws with the screw thread 211c at the support cylinder 211. Alternatively, the pusher 223a and knob 223b at the first adjusting member 223 may be integral with each other.

A third dragging member 241 at the reel body side in a second drag mechanism 240 is supported non-rotatably and axially slidably onto the inner peripheral surface of front chamber 211a, and a fourth dragging member 242 at the spool shaft side is supported non-rotatably and axially movably onto the outer peripheral surface at the front end of rotary tubular shaft 210.

A second adjusting member 243 at the second drag mechanism 240 comprises a press-contact member supported rotatably and axially movably onto the rotary tubular shaft 210, a threaded cone 243b for axially moving the press-contact member, and an adjusting lever 243c engageable detachably with the threaded cone 243b. Threaded cone 243b screws with the screw thread 211a on the support cylinder 211. The third dragging member 241 at the reel body side is used as the press-contact member. The outer periphery of third dragging member 241 serving as the press-contact member includes retainers 215 projecting outwardly through the window 213. Retainers 215 are engageable with engaging portions 216 formed at the fore end of threaded cone 243b respectively. Retainers 215 and engaging portions 216 constitute an association means for associating the threaded cone 243b with the press-contact member. The adjusting lever 243c is operated to screw thread cone 243b forwardly, so that the third dragging member 241 functioning as the press-contact member moves axially forwardly in the range of window 213 to thereby press-contact the third dragging member 241 at the reel body side and fourth dragging member 242 at the spool shaft side. Alternatively, the second adjusting member 243 may be formed of a screw cone 243b integral with the adjusting lever 243c. However, a second adjusting member 243 comprising threaded cone 243b and adjusting lever 243c separate therefrom as shown in FIGS. 8-12 advantageous in that after the threaded cone 243b screws with the screw thread 211c at the support cylinder 211 to preset a press-contacting force of each of third and fourth dragging members 241 and 242, the adjusting lever 243c can be connected to the threaded cone 243b, whereby the adjusting lever 243c can always be disposed in the most suitable position with respect to the reel body 201.

Figure 10:
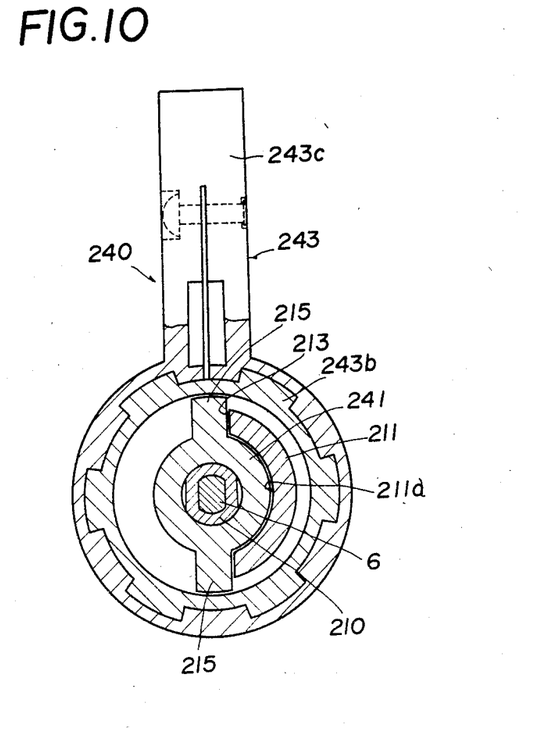
FIG. 10 is a sectional view taken on the line X—X in FIG. 8.
Figures 11, 12:
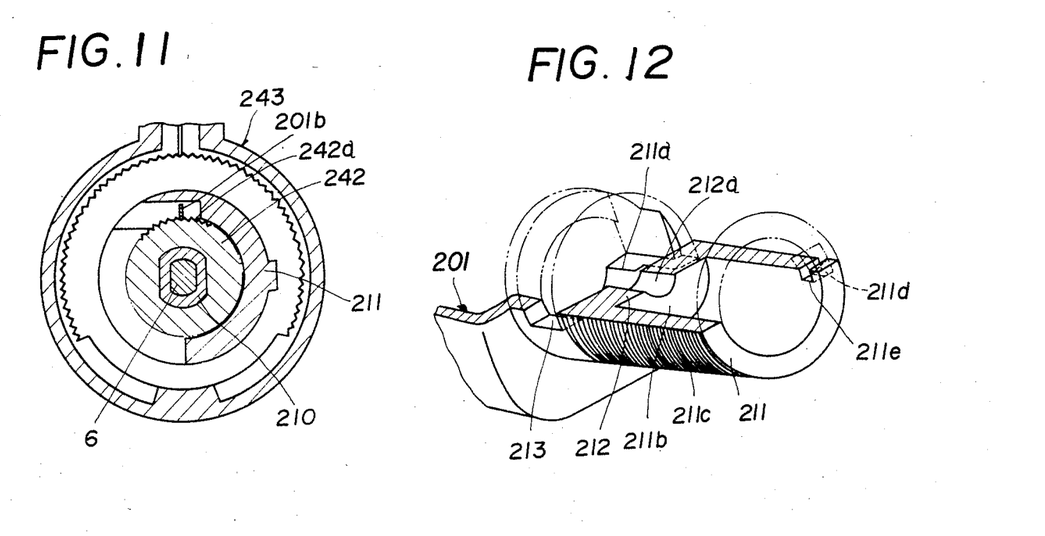
FIG. 11 is a sectional view taken on the line XI—XI in FIG. 8.
FIG. 12 is a partially cutaway perspective view of a support cylinder.

The window 213, as shown in FIG. 10, is formed by cutting out a lengthwise fore end of support cylinder 211 circumferentially at an angle of about 180°, so that the press-contact member, i.e., third dragging member 241, having retainers 215, is inserted into the front chamber 211a through the window 213. Alternatively, a plurality of windows 213 may be provided at regular intervals and are not defined in construction.

In the spinning reel shown in the drawings, at the outer periphery of the root of support cylinder 211 is mounted an annular sound generating member 217 having at its outer periphery a slightly toothed portion 217a and an elastic plate 218 engageable therewith is mounted to the adjusting lever 243c so that when the adjusting lever 243c is turned, the elastic plate 218 deflects to change the engagement with the teeth 217a to intermittently generate sounds. A positioning mechanism 219 for setting step-by-step the operating position of adjusting lever 243c is provided between the sound generating member 217 and the adjusting lever 243c, whereby the positioning mechanism 219 holds the adjusting lever 243c in the set position. Also, the positioning mechanism 219 comprises, for example, a plurality of engaging recesses 219a, a retainer 219b, such as a ball, engageable selectively with one engaging recess 219a, and an elastic element, such as a coil spring, for biasing the retainer 219b in only one direction.

At the outer periphery of the rear end of support cylinder 211 are provided a recess 211d extending circumferentially and a bore 211e communicating from an intermediate portion of recess 211d to the rear chamber 211b. An elastic ring 211f of about C-like shape and bent 211g at an intermediate portion inwardly in about U-like shape, is fitted into the recess 211d, the bent portion 211g enters into the bore 211e. Also, the bent portion 211g engages at the utmost end with splines 223c formed circumferentially by the outer periphery of pusher 223a, so that when the first adjusting member 223 is rotated, sounds are intermittently generated and also the pusher 223a is prevented from falling down.

Minute teeth 242a are provided circumferentially on the outer peripheral surface of fourth dragging member 242 at the spool shaft side in the second drag mechansim 240, and an elastic plate 201b engageable with the teeth 242a is mounted into the reel body 201, so that when the spool 5 slidably rotates together with the spool shaft 6, the elastic plate 201b is deflected to generate sounds intermittently.

In the third embodiment, since the knob 223b in the first adjusting member 223 is positioned behind the adjusting lever 243c, the knob 223b is not hindered by the adjusting lever 243c from easy operation. Also, since the first and second drag mechanisms 220 and 240 are disposed at the rear portion of reel body 201 and longitudinally on the axis of spool shaft 6, the reel body can be made small in size for the use of two drag mechanisms 220 and 240, whereby the reel providing two drag mechanisms can be small-sized and lightweight to that extent.

Furthermore, the fouth embodiment of the invention will be described in FIGS. 13 through 15, which is basically the same in construction as the third embodiment, but is different therefrom in that a second adjusting member 343 comprises an operating lever 345 having a cam shaft 344 supported rotatably to a reel body 301 and an urging member 346 having an engaging portion 346b engageable with a cam face 344a at the cam shaft 344, and an urging portion 346c for urging third and fourth dragging members 341 and 342 toward the rear wall of reel body 301.

In detail, the reel body 301 is provided at the inner surface of its upper wall at a longitudinally intermediate portion thereof with a projection 301a extending downwardly and at the inner surface of the lower wall at the rear portion thereof with a support wall 301b extending upwardly and having a circular-arc curved surface 301c at the rear side of the upper end. Cam shaft 344 is supported between the projection 301a and the rear wall of reel body 301 in relation of being rotatable and extending in parallel to the spool shaft 6, projecting at the rear end outwardly from the rear wall, and fixedly supporting at the rear end the operating lever 345.

Figure 14:
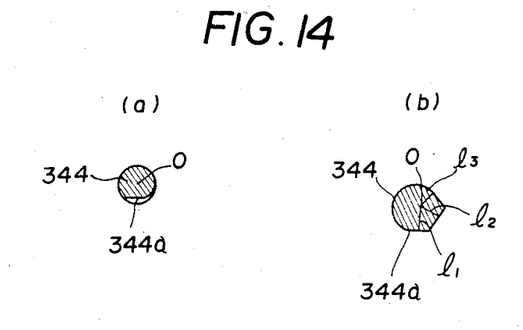

The cam face 344a at the cam shaft 344 may alternatively be a curved surface varying continuously in length from the rotational axis O as shown in FIG. 14-(a), or be changed in length from the same step-by-step as $l_1$, $l_2$ and $l_3$ (where $l_1 > l_2 > l_3$).

Figures 15, 16:
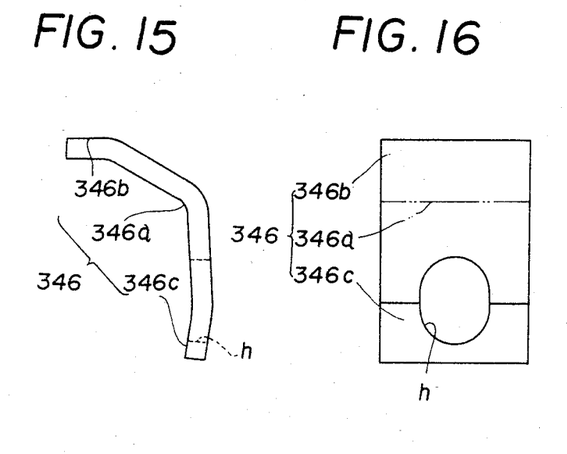
FIG. 15 is a front view of an urging memebr only in the fourth embodiment.
FIG. 16 is a side view of the urging member.

The urging member 346, as shown in FIG. 15, comprises a support portion 346a supported swingably onto the curved surface 301c at the support wall 301b, an engaging portion 346b extending upwardly forwardly from the support portion 346a and engageable with the cam face 344a at the cam shaft 344, and an urging portion 346c extending downwardly along the rear surface of support wall 301b and abutting against the third dragging member 341, the urging portion 346c providing at a central portion thereof a through bore h through which the rotary tubular shaft 310 is inserted.

Figure 13:
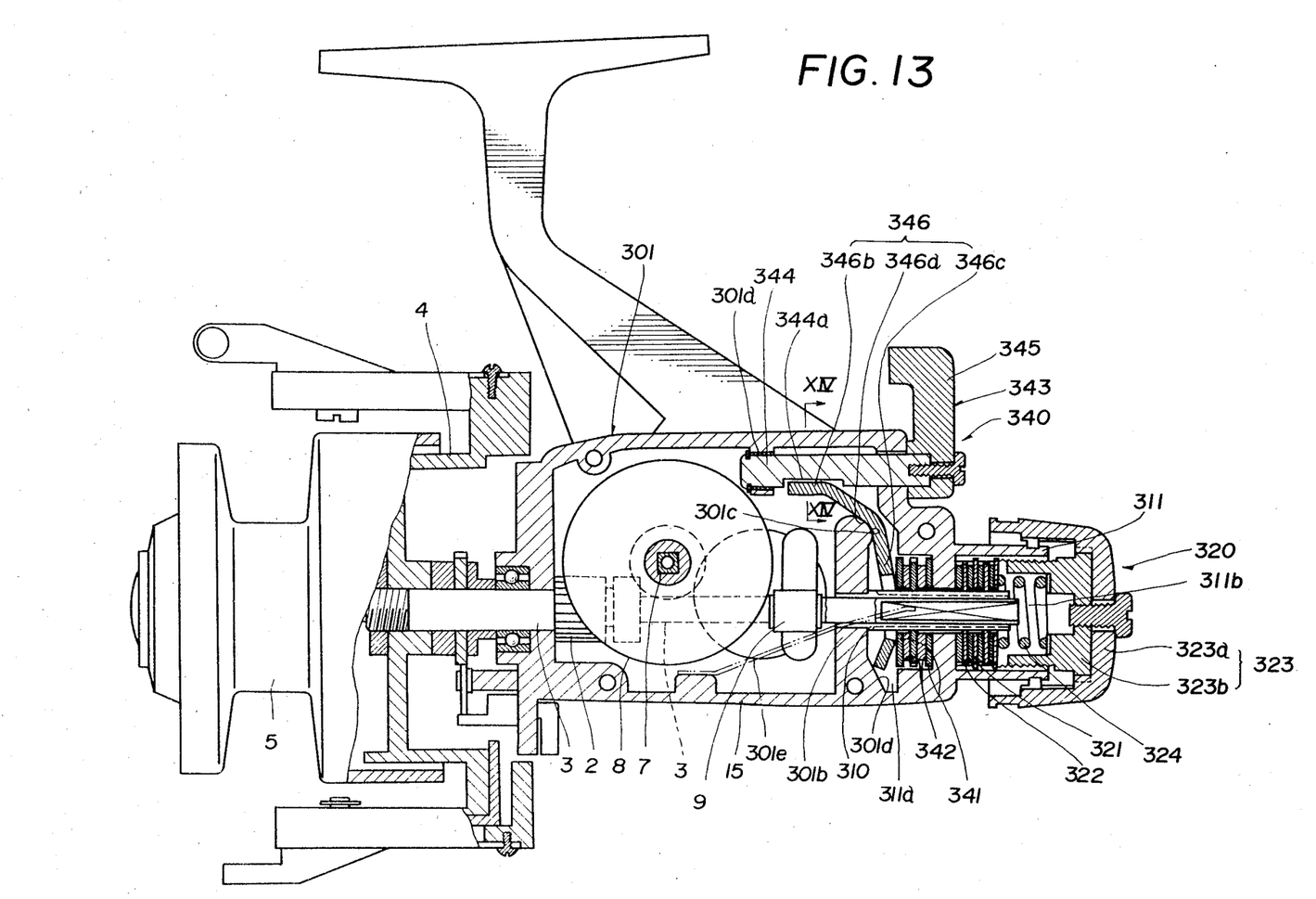
FIG. 13 is a longitudinal sectional front view of a fourth embodiment of the invention, FIGS. 14-(a) and -(b) are illustrations of two kinds of cam faces of a cam shaft according to the fourth embodiment, shown in section taken on the line XIV—XIV in FIG. 13.

The operating lever 345 is operated to swing, through the cam face 344a, the urging member 346 counter-clockwise in FIG. 13 around the curved surface 301c at the support wall 301b, so that the third and fourth dragging members 341 and 342 are adapted to be brought into press-contact with the rear wall of reel body 301.

The support wall 301b has a slope 301d at the root of wall 301b opposite to the lower end of urging member 346, so that, even when the urging member 346 is actuated and the urging portion 346c is intended to lower along the curved surface 301c, the slope 301d ensures the movement of urging portion 346c toward the rear wall of reel body 301. Alternatively, the urging member 346 may be elastic to allow the operating lever 345 to provide a clicking feel when operated.

In the fourth embodiment, a first adjusting member 323 at a first drag mechanism 320 is the same in construction as that at the first embodiment. In detail, the first adjusting member 323 comprises a knob 323a and an adjuster 323b engageable detachably therewith, the adjuster 323b screwing with the inner periphery of a support cylinder 311. A spring 324 is interposed between the adjuster 323b and the first dragging members 321, and the knob 323a is rotated to press-contact the first dragging members 321 at the body side and second dragging members 322 at the spool shaft side with each other through the spring 324. Knob 323a operates in the same direction as the operating lever 345.

In the fourth embodiment, the coefficient of friction between the third and fourth dragging members 341 and 342, reversely to the first embodiment, is made larger than that between the first and second dragging members 321 and 322. Specifically, the first drag mechanism 320 diminishes the pitch of screwing of adjuster 323b with the support cylinder 311, reduces an urging force of spring 324. At the second drag mechanism 340, the cam face 344a is formed to increase an amount of operation of urging member 346; or a ratio of effective length of engaging portion 346b at the urging member 346 to that of urging portion 346c thereof is enlarged. This enables the desired fine adjustment and rough adjustment.

In addition, one of the fourth dragging members 342 is provided at its outer periphery with splines and an elastic sound generating member 301e for engaging with the splines to generate sounds is provided at the reel body 301. In addition, in FIG. 13, reference numeral 311a designates a front chamber and 311b a rear chamber.

In a case where in the abovementioned construction the spool shaft is adjusted of its rotational resistance, an angler puts behind the reel body the tip of the finger of his hand to operate the reel and stretches the finger to the adjuster at the first drag mechanism and axially rotates it to thereby enable the fine adjustment of the rotational resistance applied to the spool shaft per unit operational amount. Also, he can stretch the finger to the adjuster at the second drag mechanism almost without shifting his hand operating the reel, so that the adjuster is given a swinging force around the longitudinal axis the same as the adjuster in the first drag mechanism, thereby enabling rough adjustment of the rotational resistance.

As seen from the above, the dragging device of the invention adjusts the adjusting members at the first and second drag mechanism to thereby enable the spool shaft to be adjustable desirably of the dragging force, whereby both drag mechanisms are used to facilitate adjustment of dragging force to a desired value, thereby enabling adjustment of dragging force applied to the spool shaft depending on the fishing conditions.

Although several embodiments have been described, they are merely exemplary of the invention and not to be construed as limiting, the invention being defined solely by the appended claims.

What is claimed is:

1. A dragging device for a spinning reel, which applies a rotational resistance against rotation of a spool shaft carrying a spool, said dragging device comprising first and second drag mechanisms for applying said rotational resistance against rotation of said spool shaft, said first drag mechanism comprising a first dragging means non-rotatable relative to said reel body, a second dragging means rotatable in response to rotation of said spool shaft, and a first adjusting mechanism for causing said first and second dragging means to make press-contact with each other to adjustably apply a dragging force against rotation of said spool shaft, said second drag mechanism comprising a third dragging means non-rotatable relative to said reel body, a fourth dragging means rotatable in response to rotation of said spool shaft, and a second adjusting mechanism for causing said third and fourth dragging means to make press-contact with each other to adjustably apply a dragging force against rotation of said spool shaft, so that said first and second drag mechanisms each can adjust by said first and second adjusting mechanisms respectively a dragging force applied against rotation of said spool shaft, whereby said spool shaft is adapted to be subjected to a total dragging force as adjusted by each of said drag mechanisms.

2. A dragging device for a spinning reel as set forth in claim 1, wherein said first dragging means comprises a plurality of first dragging members, said second dragging means comprises a plurality of second dragging members, said third dragging means comprises a plurality of third dragging members, and said fourth dragging means comprises a plurality of fourth dragging members.

3. A dragging device for a spinning reel as set forth in claim 2, wherein said second drag mechanism has a regulation means for regulating an operational range of said second adjusting mechanism.

4. A dragging device for a spinning reel as set forth in claim 2, wherein said second drag mechanism comprises a support shaft non-rotatably supported relative to said reel body and spaced a distance from said spool shaft and a rotary member supported rotatably relative to said support shaft and rotatable in response to rotation of said spool shaft, said fourth dragging members being non-rotatable with respect to said rotary member.

5. A dragging device for a spinning reel as set forth in claim 4, wherein said support shaft is disposed substantially parallel to said spool shaft, the first adjusting mechanism of said first drag mechanism is supported rotatably with respect to a longitudinal axis of said spool shaft, and the second adjusting mechanism of said second drag mechanism is supported rotatably with respect to a longitudinal axis of said support shaft.

6. A dragging device for a spinning reel as set forth in claim 4, wherein one of said first and second adjusting mechanisms comprises a rotational position adjustment means having an operating portion and the other of said first and second adjusting mechanisms comprises a lever.

7. A dragging device for a spinning reel as set forth in claim 2, wherein a rear portion of said reel body comprises a projecting member which projects rearwardly from said rear portion in a direction away from an end of said spool shaft on which said spool is carried, said projecting member having a hollow portion having a partition which partitions said hollow portion into a front chamber and a rear chamber, said rear chamber housing therein said first and second dragging members of said first drag mechanism, said front chamber housing therein said third and fourth dragging members of said second drag mechanism, said spool shaft passing through said partition, one of said first and second drag mechanisms being disposed axially frontwardly of said partition and the other of said first and second drag mechanisms being disposed axially rearwardly of said partition.

8. A dragging device for a spinning reel as set forth in claim 7, wherein the first adjusting mechanism of said first drag mechanism is screwably connected with a rear portion of said hollow portion of said projecting member, and the second adjusting mechanism of said second drag mechanism is supported frontwardly of said first adjusting mechanism and rotatably relative to an axis which is positioned substantially parallel to a longitudinal axis of said spool shaft.

9. A dragging device for a spinning reel as set forth in claim 8, wherein the second adjusting mechanism of said second drag mechanism comprises an adjusting lever supported rotatably relative to said projecting member, and a press-contact member movable axially but not rotatably relative to said spool shaft in response to rotation of said adjusting lever.

10. A dragging device for a spinning reel as set forth in claim 9, wherein said adjusting lever comprises a lever body and said second adjusting mechanism further comprises a threaded elongated member supported non-rotatably relative thereto, said threaded elongated member being screwable with said projecting member and axially movable relative to said spool shaft when said threaded elongated member is screwably rotated relative to said projecting member, said adjusting mechanism further comprising means disposed between said threaded elongated member and said press-contact member for causing said press-contact member to move axially relative to said spool shaft in response to screwing rotation of said threaded elongated member relative to said projecting member.

11. A dragging device for a spinning reel as set forth in claim 9, wherein said second drag mechanism has a regulation means for regulating an operational range of said adjusting lever.

12. A dragging device for a spinning reel as set forth in claim 8, wherein the second adjusting member of said second drag mechanism comprises an operating lever which has a cam shaft having a cam face and which is supported rotatably relative to said reel body, said second adjusting member further comprising an urging member having an engaging portion engaging said cam face of said cam shaft and an urging portion for urging said third and fourth dragging members of said second drag mechanism toward said partition.

13. A dragging device for a spinning reel as set forth in claim 12, wherein said cam shaft is disposed parallel to said spool shaft and the first adjusting mechanism of said drag mechanism screwable with said projecting member has a same operating direction as an operating direction of said operating lever of said second drag mechanism.

14. A dragging device for a spinning reel as set forth in claim 2, wherein one of said first and second drag mechanisms comprises a rough adjustment means and the other of said first and second drag mechanisms comprises a fine adjustment means.

15. A dragging device for a spinning reel as set forth in claim 2, wherein said first and third dragging members are fixed relative to said reel body and said second and fourth dragging members are fixed relative to said spool shaft.

16. A dragging device for a spinning reel as set forth in claim 6, wherein said rotational position adjustment means comprises a knob and said operating portion is disposed at an outer periphery thereof.

17. A dragging device for a spinning reel as set forth in claim 10, wherein said projecting member comprises a support cylinder and said enlongated member comprises a cylinder.

* * * * *